US008655625B2

(12) United States Patent
Souloumiac (10) Patent No.: US 8,655,625 B2
(45) Date of Patent: Feb. 18, 2014

(54) METHOD FOR SEPARATING MIXED SIGNALS INTO A PLURALITY OF COMPONENT SIGNALS

(75) Inventor: Antoine Souloumiac, Montrouge (FR)

(73) Assignee: Commissariat à l'Energie Atomique et aux Energies (FR)

( * ) Notice: Subject to any disclaimer, the term of this patent is extended or adjusted under 35 U.S.C. 154(b) by 705 days.

(21) Appl. No.: 12/811,584

(22) PCT Filed: Jan. 5, 2009

(86) PCT No.: PCT/EP2009/050029
§ 371 (c)(1),
(2), (4) Date: Jul. 2, 2010

(87) PCT Pub. No.: WO2009/083615
PCT Pub. Date: Jul. 9, 2009

(65) Prior Publication Data
US 2010/0286963 A1 Nov. 11, 2010

(30) Foreign Application Priority Data
Jan. 3, 2008 (FR) .................................. 08 50031

(51) Int. Cl.
*H03F 1/26* (2006.01)
(52) U.S. Cl.
USPC .......................................................... 702/196
(58) Field of Classification Search
USPC .......................................................... 702/196
See application file for complete search history.

(56) References Cited

FOREIGN PATENT DOCUMENTS

WO 2006/072150 A1 7/2006

OTHER PUBLICATIONS

Afsari et al, Some Gradient Based Joint Diagonalization Methods for ICA, Independent Component Analysis and Blind Source Separation, vol. 3195, pp. 437-444, 2004.
Fadaili et al, Non-orthogonal joint diagonalization Zero diagonalization for source separation based on time frequency distributions, IEEE Trans. On Signal Processing, vol. 55, issue 5, part 1, pp. 1673-1687, 2007.
Tichavsky et al, A fast approximate joint diagonalization algorithm using a criterion with a block diagonal weight matrix, Proceedings of ICASSP 2008, pp. 3321-3324.
Ziehe A et al: "A Fast Algorithm for Joint Diagonalization with Non-orthogonal Transformations and its Application to Blind Source Separation" Journal of Machine Learning Research, MIT Press, Cambridge, MA, US, No. 5, Jan. 1, 2004, pp. 777-800, XP008097301.
Vollgraf R et al: "Quadratic optimization for simultaneous matrix diagonalization" IEEE Transactions on Signal Processing, IEEE Service Center, New York, NY, US, vol. 54, No. 9, Sep. 1, 2006, pp. 3270-3278, XP008098870.
Bijan Afsari Ed—Justinian Rosca et al: "Simple LU and QR Based Non-orthogonal Matrix Joint Diagonalization" Independent Component Analysis and Blind Signal Separation Lecture Notes in Computer Science;;LNCS, Springer, Berlin, DE, vol. 3889, Jan. 1, 2006, pp. 1-7, XP019028776

(Continued)

*Primary Examiner* — Stephen Cherry
(74) *Attorney, Agent, or Firm* — Lerner, David, Littenberg, Krumholz & Mentlik, LLP (57) ABSTRACT

The invention relates to a method for breaking down a set of signals consisting of an instantaneous linear mixture of independent components. The method comprises a step (200) consisting in estimating a mixture matrix A by using the product of one or more trigonometric rotation matrices by one or more hyperbolic rotation matrices.

16 Claims, 5 Drawing Sheets

(56) References Cited

OTHER PUBLICATIONS

B. Afsari: "What can make joint diagonalization difficult?" ICASSP, [Online] vol. 3, 2007, pp. 111-1377-111-1380, XP002517296 Retrieved from the Internet: URL:http://www.isr.umd.edu/Labs/ISL/ICA2006/ICASSP2007_Bijan.pdf> [retrieved on Feb. 13, 2009].

B. Afsari: "Sensitivity Analysis for the Problem of Matrix Joint Diagonalization" Some Papers and Codes on Joint Diagonalization, [Online] Feb. 26, 2007, pp. 1-23, XP002517297 Retrieved from the Internet: URL:http://www.isr.umd.edu/Labs/ISL/ICA2006/Sensitivity_Final.pdf> [retrieved on Feb. 13, 2009].

Gene H. Golub et al: "Matrix Computations (3rd ed.)" 1996, John Hopkins U. , XP002505493 p. 215-223, 426-438, 611-613.

Pierre Common et Christian Jutten: 2007, Lavoisier Hermes , XP002505494, p. 169-196.

Pierre Common et Christian Jutten: 2007, Lavoisier-Hermes , XP002505495, p. 197-229.

Simon Haykin: "Unsupervised Adaptive Filtering 1 : Blind Source Separation" 2000, Wiley, XP002505496 p. 219-225.

A. Hyvarinen et al: "Independent Component Analysis" 2001, Wiley, XP00250501 p. 229-237.

A. Cichocki et al: "Adaptive Blind Signal and Image Processing" 2002, Wiley, XP002505502 p. 129-176.

J.-F- Cardoso: "On the performance of orthogonal source separation algorithms" Proceedings of Eusipco-94—7th European Signal Processing Conference, Sep. 13, 1994, pp. 776-779, XP008099023.

L. De Lathauwer: "Signal Processing based on Multilinear Algebra" PHD Thesis—Katholieke Univ. Leuven, 1997, XP008098805.

Pham D-T: "Blind Seperation of instantaneous mixture of sources via the Gaussian mutual information criterion" Signal Processing, Elsevier Science Publishers B.V. Amsterdam, NL, vol. 81, No. 4, Apr. 1, 2001, pp. 855-870, XP004234881.

Wang Fuxiang et al: "A new joint diagonalization algorithm with application in blind source separation" IEEE Signal Processing Letters, IEEE Service Center, Piscataway, NJ, US, vol. 13, No. 1, Jan. 1, 2006, pp. 41-44, XP008098880.

Van Der Veen A-J Ed—Institute of Electrical and Electronics Engineers: "Joint diagonalization via subspace fitting techniques" 2001 IEEE International Conference on Acoustics, Speech, and Signal Processing (ICASSP), New York, NY : IEEE, US, vol. 5, May 7, 2001, pp. 2773-2776, XP010803600.

Gotze J et al: "Hyperbolicrotation of subspaces and VLSI algorithms for signal processing and numerical linear algebra" IEEE International Symposium on Circuits and Systems, May 1, 1990, May 3, 1990 pp. 1604-1607, XP010005551.

Nathalie Delfosse et al: "Adaptive Blind Separation of Independent Sources:A Second-Order Stable Algorithm for the General Case" IEEE Transactions on Circuits and Systems Part I: Regular Papers, IEEE Service Center, New York, NY, US, vol. 47, No. 7, Jul. 1, 2000, XPOI1012150.

Jean-Francois Cardoso: "High-Order Contrasts for Independent Component Analysis" Neural Computation, Massachusetts Institute of Technology, US, vol . 11, Jan. 1, 1999, pp. 157-192, XP002302154.

Mati Wax et al: "A Least-Squares Approach to Joint Diagonalization" IEEE Signal Processing Letters, IEEE Service Center, Piscataway, NJ, US, vol. 4, No. 2, Feb. 1, 1997, XP011059916.

Flury B N: "Common Principal Componentsin k groups" Journal of the American Statistical Association, American Statistical Association, New York, US, vol. 79, No. 386, Jan. 1, 1984, pp. 892-897, XP008098821.

Flury B N et al: "An algorithm for simultaneous orthogonal transformation of several positive definite symmetric matrices to near" SIAM Journal on Scientific and Statistical Computing, Philadelphia, PA, US, vo 1. 7, No. 1, Jan. 1, 1986, pp. 169-184, XP008098827.

A. Bunse et al—Numerical methods for simultaneous diagonalization, vo1.14, No. 4, pp. 927-949, 1993.

Belouchrani et al., "A blind source separation technique using second order statistics", IEEE transactions on Signal Processing, vol. 45, No. 2, pp. 434-444, 1997.

Cardoso et al., "Blind Beamforming for non Gaussian Signais" 140(6); 362-370 (1993).

Cardoso J-F et al: "Jacobi Angles for Simultaneous Diagonalization", SIAM Journal on Matrix Analysis and Applications, The Society, Philadelphia, PA, US, vol. 17, No. 1, Jan. 1, 1996, pp. 161-164, XP008054397.

D. Janovska: "Decomposition of an Update Correlation Matrix via Hyperbolic Transformations", Applications of Mathematics, Jan. 1, 1900, pp. 101-113, XP008098939.

Degerine S et al: "A Comparative Study of Approximate Joint Diagonalization Algorithms for Blind Source Separation in Presence of Additive Noise" IEEE Transactions on Signal Processing, IEEE Service Center, New York, NY, US, vol. 55, No. 6, Jun. 1, 2007, pp. 3022-3031, XP011184691.

Degerine, "Sur la diagonalisation conjointe approchee par un critere de moindres carres", Proceedings XVIII Coloque Gretsi 2001, n 2, pp. 311-314, Sep. 2001.

Dinh Tuan Pham et al: "Blind Separation of Mixture of Independent Sources Through a Quasi-Maximum Likelihood Approach" IEEE Transactions on Signal Processing, IEEE Service Center, New York, NY, US, vol. 45, No. 7, Jul. 1, 1997, XP011057854.

Dinh Tuan Pharm "Joint Approximative Diagonalization of Positive Definite Hermitian Matrices", 1136-1552 (2001).

Hench, the Pseudo-Givens Rotation, Research Report No. 1800, Academy of Science of the Czech Republic, 1994.

Hsieh et al, Dual state Systolic Architectures for up/downdating RLS adaptive Filtering, IEEE Trans. On Circuits and Systems-II, Analog and digital signal processing, vol. 39, No. 6, pp. 382-385, 192.

Souloumiac "Non-Orthogonal joint diagonalization by combining givens and hyperbolic rotations", 1-11 (2009).

Souloumiac et al., "Comparaisons De Methodes Separation De sources"—Proceedings of GRETSI, 661-664 (1991).

Wang et al: "Nonorthogonal Joint Diagonalization Algorithm Based on Trigonometric Parameterization", IEEE Transactions on Signal Processing, IEEE Service Center, New York, NY, US, vol. 55, No. 11, Nov. 1, 2007, pp. 5299-5308, XP011194658.

Yeredor A et al: "Approximate joint diagonalization using a natural gradient approach", Jan. 1, 2004, pp. 89-96, XP008098829.

Yeredor A: "Approximate joint diagonalization using non-orthogonal matrices" Jan. 1, 2000, pp. 33-38, XP008098828.

Yeredor A: "Non-Orthogonal Joint Diagonalization in the Least-Squares Sense With Application in Blind Source Separation" IEEE Transactions on Signal Processing, IEEE Service Center, New York, NY, US, vol. 50, No. 7, Jul. 1, 2002, pp. 1545-1553, XP011080187.

METHOD FOR SEPARATING MIXED SIGNALS INTO A PLURALITY OF COMPONENT SIGNALS

CROSS REFERENCE TO RELATED APPLICATIONS

The present application is a national phase entry under 35 U.S.C. §371 of International Application No. PCT/EP2009/050029, filed Jan. 5, 2009, published in English, which claims priority from French Patent Application No. 0850031, filed Jan. 3, 2008, all of which are incorporated herein by reference.

The present invention relates to the general technical field of signal processing, and more specifically of separating source signals from mixtures of source signals by using blind separation of sources.

The present invention may find many applications. It may notably be applied to processing electroencephalograms, to signal processing in the field of radio communications, or further to the processing of mass spectra.

GENERAL PRESENTATION OF THE PRIOR ART

The problem of separating sources is a relatively recent problem in signal processing, which consists of separating statistically independent sources, from several mixtures recorded either by a network of sensors at a given instant (space dispersion).

It frequently happens that an observed physical phenomenon is the superposition of several independent elementary phenomena and that this superposition is expressed by an instantaneous linear combination (or mixture).

The measurement data from the observation of this phenomenon are then an instantaneous linear mixture of the contributions from each independent elementary phenomenon.

By placing a plurality of sensors, it is then possible to measure several different instantaneous linear mixtures of these contributions. For example, in electroencephalography, various electrodes are placed on the scalp of a patient. These electrodes enable the cerebral activity of the brain of the patient to be measured.

Each electrode measures a mixture of electric signals emitted by various sources of the brain, the different electrodes measuring different mixtures. Mixtures of sources are said to be different when the sources appear therein in different proportions or with different weights.

In this case, no other information is known:
  on the sources and
  on how the signals from these sources mix.

Source separation is then used for identifying the weights of the mixture in a first phase, and for separating in the measurements the contribution of each source in a second phase. This allows separate analysis of the different contributions without being disturbed by the mixture.

Presently there are two types of methods for source separation.

The first type of methods uses a preliminary step, a so-called <<whitening>> step, with which the subsequent computational steps may be facilitated in order to identify the weights of the mixture. However, this whitening step induces an error which cannot be corrected upon the separation of the contribution of each source. This type of methods is therefore not very accurate.

The second type of methods does not require any whitening step; however this second type of method induces problems in terms of efficiency and computational cost.

An object of the present invention is to propose a method for separating mixed signals into a plurality of component signals with which at least one of the drawbacks of the aforementioned types of methods may be overcome.

PRESENTATION OF THE INVENTION

For this purpose, a method is provided for separating mixed signals $(x_1(t), \ldots, x_N(t))$ recorded by at least two sensors into a plurality of component signals $(s_1(t), \ldots, s_M(t))$, the mixed signals $(x_1(t), \ldots, x_N(t))$ corresponding to N linear combinations of M component signals $(s_1(t), \ldots, s_M(t))$ stemming from independent sources, each mixed signal being able to be written as the product of a mixture matrix (A) multiplied by a vector of the component signals from the sources $(s_1(t), \ldots, s_M(t))$, the method further comprising a joint diagonalization step in which the mixture matrix A is estimated from a product of rotation matrices corresponding to one or more Givens rotation matrices $(G(\theta))$ and to one or more "hyperbolic rotation" matrices $(H(\phi))$.

Within the scope of the present invention, by "hyperbolic rotation matrix", is meant a rotation matrix including terms which are hyperbolic functions (for example, cos h, sin h) and having a determinant equal to 1.

Thus, with the invention, the mixture matrix may be identified by a single fast and reliable optimization step. The fact that there is only one single step provides a more accurate result than the two-step methods (whitening followed by joint diagonalization) such as in [1], [1b], [2]. Indeed, the unavoidable errors of the first step cannot be corrected by the second step. Further, the proposed method uses an algebraic algorithm (these are products of 2×2 size "trigonometric" and "hyperbolic" rotation matrices), which is particularly robust and not very costly in terms of computational power.

The methods comprising a whitening step build an orthogonal mixture matrix by the product of elementary orthogonal matrices (Givens rotations).

As for the present invention, it allows a mixture matrix to be built with a determinant equal to 1 by the multiplication of matrices with a determinant equal to 1. The group of orthogonal matrices (with a positive determinant +1) is included in the group of matrices with a determinant equal to 1. The steps for computing the mixture matrix are therefore facilitated with the method of the present invention which allows the initial constraints on the mixtures to be limited. The initial "whitening" step is no longer essential but the robustness and efficiency of "algebraic" methods are preserved.

Consequently, the method of the present invention enables the computation of a mixture matrix that is closer to the physical reality of the mixture, than the mixture matrix obtained with the method comprising a whitening step.

Preferred but non-limiting aspects of the method according to the invention are the following:
  Givens rotation matrices include elements corresponding to trigonometric functions of $\theta$ and hyperbolic rotation matrices include elements corresponding to hyperbolic functions of $\phi$;
  the diagonalization step comprises a step for multiplying a family of estimated matrices $(\hat{R}_k)$ by the product of a Givens rotation matrix and of a hyperbolic rotation matrix on the right, and the transposed matrix of this product on the left; and for computing the values of $\theta_n$ and of $\phi_n$ in order to minimize the non-diagonal terms of the resulting matrices of order n of this multiplication;

the multiplication step is repeated on the resulting matrices of order n;

the multiplication step is repeated until the Givens angle $\theta$ and the "hyperbolic angle" $\phi$ are such that $\cos \theta$ et $\cos h\phi$ tend to 1 respectively;

the estimated matrices $\hat{R}_k$ are (to within the estimation error) equal to the product of the mixture matrix by a diagonal matrix by the transposed mixture matrix ($R_k = AD_k A^T$), these are for example matrices of cumulants, or covariance matrices in different frequency bands, or intercorrelation matrices with different time shifts, or covariance matrices estimated over different time intervals;

the Givens rotation matrices comprise $\cos \theta$ elements on the diagonal, a $\sin \theta$ element below the diagonal and a $-\sin \theta$ element above the diagonal, and the "hyperbolic rotation" matrices comprise $\cos h\phi$ elements on the diagonal, $\sin h\phi$ element below the diagonal, and $\sin h\phi$ element above the diagonal;

the Givens rotation matrices are of the type $$\begin{pmatrix} \cos\theta & -\sin\theta \\ \sin\theta & \cos\theta \end{pmatrix}$$

and the "hyperbolic rotation" matrices are of the type $$\begin{pmatrix} \cosh\varphi & \sinh\varphi \\ \sinh\varphi & \cosh\varphi \end{pmatrix}.$$

The invention also relates to a device for separating mixed signals recorded by at least two sensors into a plurality of component signals, each mixed signal corresponding to an instantaneous linear combination of component signals stemming from independent sources, each mixed signal being able to be written as the product of a mixture matrix multiplied by a vector of component signals stemming from the sources, characterized in that the device further comprises means for joint diagonalization in which the mixture matrix is estimated from a product of rotation matrices corresponding to one or more Givens rotation matrices and to one or more hyperbolic rotation matrices.

The invention also relates to a computer program product comprising program code instructions recorded on a medium which may be used in a computer, characterized in that it comprises instructions for applying the method described above.

PRESENTATION OF THE FIGURES

Other characteristics, objects and advantages of the present invention will further be apparent from the description which follows, which is purely an illustration and not a limitation, and it should be read with reference to the appended figures in which.

DESCRIPTION OF THE INVENTION

The following algebraic properties known from the skilled person are used hereafter:

Transposed of a product of 2 matrices A and B:

$(AB)^T = B^T A^T$

Inverse of the product of two matrices A and B:

$(AB)^{-1} = B^{-1} A^{-1}$

Givens rotation:

$G(\theta)^{-1} = G(\theta)^T = G(-\theta)$

Hyperbolic rotation:

$H(\phi)^{-1} = H(-\phi)$

Symmetry of Hyperbolic rotation:

$H(\phi) = H(\phi)^T$

Figure 1:
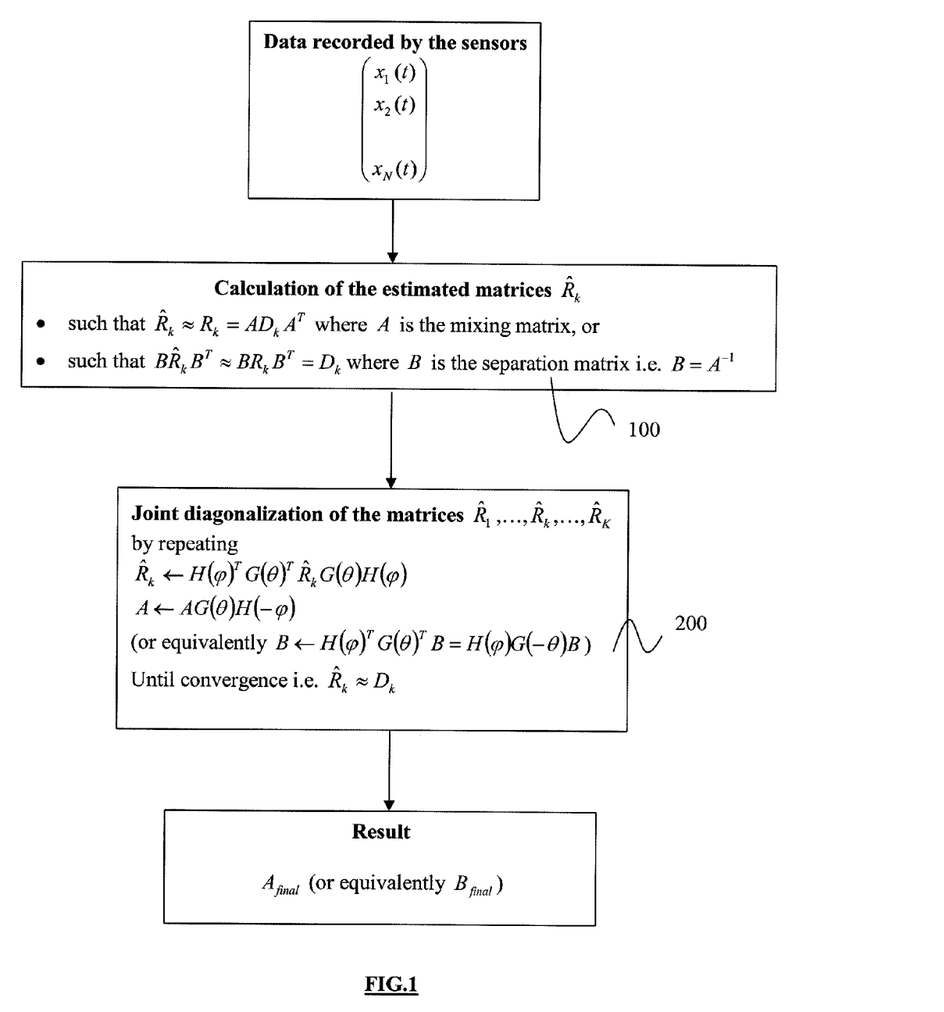
FIG. 1 illustrates an embodiment of the method according to the invention.

An embodiment of the method according to the invention will now be described in more detail with reference to FIG. 1.

Breaking down a mixture into independent components is of interest because it facilitates the interpretation, the analysis or the processing of each of the phenomena which concealed one another in the mixture.

These may be for example:

various (cerebral and muscular) electric phenomena contributing to an electroencephalographic signal (EEG), various radio transmitters in a narrow frequency band, light emissions from different fluorochromes present in a solution, mass spectra of different mixtures of the same molecules.

By separating the different contributions, it is then possible:

to study the EEG signal rid of muscular parasites (blinks, ECG, etc.), to demodulate the signal from each radiofrequency source separately, to estimate the concentration of each fluorochrome (by cytometry for example) or to identify the different molecules present in the medium studied through mass spectrometry.

The signal of a source depends on a variable quantity which may be time (EEG, radiofrequency), wavelength (fluorescence), mass (mass spectrometry), etc.

In the following, the method according to the invention will be presented while considering that the signals from the sources depend on time without this restricting the general nature of the method.

The problem of separating sources is mathematically modeled in the following way.

Each of the M sources emits a signal $s_m(t)$ independent of the signals emitted by the other sources.

The mixture (at a given instant t) of these M contributions is observed by a network of N sensors (where N>M or N=M) which provide N distinct mixtures.

The data observed at an instant t, noted as x(t), are therefore multidimensional.

The vector of these N observations at a given instant may be written as the product of a matrix A (N lines, M columns), a so-called "mixture matrix", by the vector s(t) of the source signals, i.e.:

$$\begin{pmatrix} x_1(t) \\ x_2(t) \\ \vdots \\ \vdots \\ x_N(t) \end{pmatrix} = \begin{pmatrix} a_{11} & a_{12} & \cdots & a_{1M} \\ a_{21} & a_{22} & \cdots & a_{2M} \\ \vdots & \ddots & \ddots & \vdots \\ \vdots & & \ddots & \vdots \\ a_{N1} & a_{N2} & \cdots & a_{NM} \end{pmatrix} \begin{pmatrix} s_1(t) \\ s_2(t) \\ \vdots \\ s_M(t) \end{pmatrix} \text{ i.e. } x(t) = As(t)$$

The contributions $s_m(t)$ of the different sources to the measurements x(t) may be shown by reformulating the previous equation:

$$\begin{pmatrix} x_1(t) \\ x_2(t) \\ \vdots \\ \vdots \\ x_N(t) \end{pmatrix} = \sum_{m=1}^{m=M} \begin{pmatrix} a_{1m} \\ a_{2m} \\ \vdots \\ \vdots \\ a_{Nm} \end{pmatrix} s_m(t) = \sum_{m=1}^{m=M} a_m s_m(t)$$

The method according to the invention allows the mixture matrix A to be estimated without any a priori information on this matrix (it is only supposed to be non-singular) and the source signals may then be estimated.

The source signals are supposed to be independent and some of their statistical properties are utilized such as their non-Gaussian character, their spectral differences or their non-stationary character for example.

In a first step 100, a family of K estimated matrices $\hat{R}_k$ is calculated (for k comprised between 1 and K) from data recorded by the sensor network.

These estimated matrices $\hat{R}_k$ are equal (to within the estimation error) to matrices $R_k$ which have the following structure:

$$R_k = AD_kA^T = \sum_{m=1}^{m=M} D_k(m,m) a_m a_m^T$$

wherein $D_k$ are diagonal matrices, and wherein $A^T$ is the transposed mixture matrix A. Of course, one skilled in the art will understand that the matrices $D_k$ may be diagonal block-wise.

The 3$^{rd}$ term of the equation is only a reformulation of the 2$^{nd}$ one which shows the $R_k$ matrices as weighted sums of M matrices of rank 1 (the $a_m a_m^T$). The term $D_k(m,m) a_m a_m^T$ is the contribution of the source m to the matrix $R_k$.

Depending on these contexts, these estimated matrices $\hat{R}_k$ may be matrices of cumulants of order 3 or 4 (JADE method [1], [1b]), covariance matrices in different frequency bands [3], intercorrelation matrices with different time shifts (SOBI method [2]) or covariance matrices estimated over different time intervals [3]. Of course, these estimated matrices may be of other types known to one skilled in the art.

In a second step 200, joint diagonalization of the estimated matrices is carried out as described in more detail in the following.

The method according to the invention allows the A matrix to be calculated from the $\hat{R}_1, \ldots, \hat{R}_k, \ldots, \hat{R}_K$ matrices.

A matrix B is sought such that all the matrices $B\hat{R}_k B^T$ are "as diagonal" as possible:

$$B\hat{R}_k B^T = D_k$$

B is built as a product of elementary N×N matrices of the following form:

$$M(i,j,\theta,\varphi) = \begin{matrix} \\ i \\ j \\ \\ \end{matrix} \begin{pmatrix} I_{i-1} & & & & \\ & \alpha & & \beta & \\ & & I_{j-i-1} & & \\ & \gamma & & \delta & \\ & & & & I_{N-j} \end{pmatrix}$$

wherein i<j are any two indices between 1 and N, wherein $I_p$ designates the identity matrix of size p×p and wherein $$\begin{pmatrix} \alpha & \beta \\ \gamma & \delta \end{pmatrix}$$

is the product of a Givens matrix of the $$\begin{pmatrix} \cos\theta & -\sin\theta \\ \sin\theta & \cos\theta \end{pmatrix}$$

type (wherein $\theta$ is an angle of the Givens rotation) by a hyperbolic rotation matrix of the $$\begin{pmatrix} \cosh\varphi & \sinh\varphi \\ \sinh\varphi & \cosh\varphi \end{pmatrix}$$

type (wherein $\varphi$ is the hyperbolic rotation angle) so that:

$$\begin{pmatrix} \alpha & \beta \\ \gamma & \delta \end{pmatrix} = \begin{pmatrix} \cos\theta & -\sin\theta \\ \sin\theta & \cos\theta \end{pmatrix} \times \begin{pmatrix} \cosh\varphi & \sinh\varphi \\ \sinh\varphi & \cosh\varphi \end{pmatrix}$$

Thus, a difference with the diagonalization methods of the prior art is that the matrix B (and therefore the mixture matrix A) is estimated from a product of rotation matrices with one or more Givens rotation matrices and with one or more hyperbolic rotation matrices.

By "hyperbolic rotation matrix" is meant a matrix including elements corresponding to hyperbolic functions of $\varphi$.

More particularly, the family of estimated matrices $\hat{R}_k$ is multiplied by:

the product of a Givens rotation matrix and a hyperbolic rotation matrix on the right of each estimated matrix $\hat{R}_k$. It is obvious for one skilled in the art that an equivalent implementation of the method would result from an inversion of the rotations (hyperbolic and then Givens rotation instead of Givens and then hyperbolic rotation).

and by the transposed matrix of this product on the left of each estimated matrix $\hat{R}_k$:

$$H_0^T(\varphi_0) \times G_0^T(\theta_0) \times \hat{R}_1 \times G_0(\theta_0) \times H_0(\varphi_0) = D_1$$

...

$$H_0^T(\varphi_0) \times G_0^T(\theta_0) \times \hat{R}_K \times G_0(\theta_0) \times H_0(\varphi_0) = D_K$$

$$\text{with } G_0(\theta_0) = \begin{pmatrix} \cos\theta_0 & -\sin\theta_0 & 0 & \cdots & 0 \\ \sin\theta_0 & \cos\theta_0 & 0 & & \vdots \\ 0 & 0 & 1 & & 0 \\ \vdots & \cdots & & \ddots & 0 \\ 0 & \cdots & 0 & 0 & 1 \end{pmatrix}$$

$$\text{and } H_0(\varphi_0) = \begin{pmatrix} \cosh\varphi_0 & \sinh\varphi_0 & 0 & \cdots & 0 \\ \sinh\varphi_0 & \cosh\varphi_0 & 0 & & \vdots \\ 0 & 0 & 1 & & 0 \\ \vdots & \cdots & & \ddots & 0 \\ 0 & \cdots & 0 & 0 & 1 \end{pmatrix}$$

The angles $\theta_0$ and $\phi_0$ which minimize the non-diagonal terms of the matrices $H_0^T(\phi_0) \times G_0^T(\theta_0) \times \hat{R}_{1\ldots K} \times G_0(\theta_0) \times H_0(\phi_0)$ resulting from this product are then sought.

This operation is repeated on the resulting matrices by shifting the elements of the Givens and hyperbolic rotation matrices to the following elements of the resulting matrices:

$$H_1^T(\varphi_1) \times G_1^T(\theta_1) \times H_0^T(\varphi_0) \times G_0^T(\theta_0) \times$$
$$\hat{R}_1 \times G_0(\theta_0) \times H_0(\varphi_0) \times G_1(\theta_1) \times H_1(\varphi_1) = D_1$$

...

$$H_1^T(\varphi_1) \times G_1^T(\theta_1) \times H_0^T(\varphi_0) \times G_0^T(\theta_0) \times$$
$$\hat{R}_K \times G_0(\theta_0) \times H_0(\varphi_0) \times G_1(\theta_1) H_1(\varphi_1) = D_K$$

$$\text{with } G_1(\theta_1) = \begin{pmatrix} \cos\theta_1 & 0 & -\sin\theta_1 & 0 & \cdots & 0 \\ 0 & 1 & 0 & & & \\ \sin\theta_1 & 0 & \cos\theta_1 & 0 & \cdots & 0 \\ 0 & 0 & 0 & 1 & & 0 \\ \vdots & \vdots & & & \ddots & \\ 0 & \cdots & 0 & 0 & & 1 \end{pmatrix}$$

$$\text{and } H_1(\varphi_1) = \begin{pmatrix} \cosh\varphi_1 & 0 & \sinh\varphi_1 & 0 & \cdots & 0 \\ 0 & 1 & 0 & & & \\ \sinh\varphi_1 & 0 & \cosh\varphi_1 & 0 & \cdots & 0 \\ 0 & 0 & 0 & 1 & & 0 \\ \vdots & \vdots & & & \ddots & \\ 0 & \cdots & 0 & 0 & & 1 \end{pmatrix}$$

and so forth for all the pairs of indices i and j:

$$H_L^T(\phi_L) \times G_L^T(\theta_L) \times \ldots \times H_0^T(\phi_0) \times G_0^T(\theta_0) \times \hat{R}_1 \times G_0(\theta_0) \times H_0(\phi_0) \times \ldots \times G_L(\theta_L) \times H_L(\phi_L) = \ldots H_L^T(\phi_L) \times G_L^T(\theta_L) \times \ldots \times H_0^T(\phi_0) \times G_0^T(\theta_0) \times \hat{R}_K \times G_0(\theta_0) \times H_0(\phi_0) \times \ldots \times G_L(\theta_L) \times H_L(\phi_L) = D$$

These operations are repeated several times on all the pairs of indices i and j until all the Givens rotation angles $\theta$ and all the hyperbolic rotation angles $\phi$ are such that $\cos\theta$ and $\cos h\phi$ tend to 1, respectively.

Of course, one skilled in the art knows that other stopping criteria—implying global convergence of the method—are possible. For example, the global increase in the diagonal elements or the global reduction in the non-diagonal elements may be monitored in order to decide to stop the iterations.

The angles $\theta$ and $\phi$ which globally minimize the non-diagonal terms of the matrices $M(i,j,\theta,\phi)^T \times \hat{R}_k \times M(i,j,\theta,\phi)$ may be obtained for example in the following way:

build a matrix C such that $$C = \begin{pmatrix} (\hat{R}_1(i,i) + \hat{R}_1(j,j))/2 & (\hat{R}_1(i,i) - \hat{R}_1(j,j))/2 & \hat{R}_1(i,j) \\ \vdots & \vdots & \vdots \\ (\hat{R}_k(i,i) + \hat{R}_k(j,j))/2 & (\hat{R}_k(i,i) - \hat{R}_k(j,j))/2 & \hat{R}_k(i,j) \\ \vdots & \vdots & \vdots \\ (\hat{R}_K(i,i) + \hat{R}_1(j,j))/2 & (\hat{R}_K(i,i) - \hat{R}_1(j,j))/2 & \hat{R}_K(i,j) \end{pmatrix},$$

calculate the generalized eigendecomposition of $C^T \times C$ and of the diagonal matrix $(-1,1,1)$, the eigenvector is noted as $v=(x,y,z)^T$ of the smallest positive generalized eigenvalue such that $z>0$ and $-x^2+y^2+z^2=1$, calculate $$\cosh\varphi = \sqrt{\frac{1+\sqrt{1+x^2}}{2}}$$

and $$\sinh\varphi = \frac{x}{\sqrt{2}\sqrt{1+\sqrt{1+x^2}}} = \frac{x}{2\cosh\varphi}$$

calculate $$\cos\theta = \sqrt{\frac{1+\frac{z}{\sqrt{1+x^2}}}{2}}$$

and $$\sin\theta = \frac{-y}{\sqrt{2(1+x^2)\left(1+\frac{z}{\sqrt{1+x^2}}\right)}} = \frac{-y}{2\cos\theta\sqrt{1+x^2}}$$

One skilled in the art will appreciate that other equivalent formulae exist since the question is only to solve the following equations:

$$\begin{cases} 2\cosh\varphi\sinh\varphi = x \\ -2\sin\theta\cos\theta(\cosh^2\varphi + \sinh^2\varphi) = y \\ (2\cos^2\theta - 1)(\cosh^2\varphi + \sinh^2\varphi) = z \end{cases}$$

The formulae above have the advantage of having good numerical stability when x tends to 0 at the end of convergence of the method.

Other minor modifications may be useful for adapting to the finite accuracy of computer calculations. For example, the smallest positive eigenvalue may theoretically be in practice very slightly negative; nevertheless it should be retained. These points are obvious for one skilled in the art.

A more complete explanation of the calculation of the angles $\theta$ and $\phi$ from the matrix C will now be described. The logic progression is the following.

For $k=1, \ldots, K$, the product (noted as $R'_k$) of the resulting matrix is calculated $R'_k = M(i,j,\theta,\phi)^T \times \hat{R}_k \times M(i,j,\theta,\phi)$:

$$R'_k = H^T(\phi,i,j) \times G^T(\theta,i,j) \times \hat{R}_k \times G(\theta,i,j) \times H(\phi,i,j)$$

Products of cosines of $\theta$ and sines of $\theta$, as well as of hyperbolic cosines of $\phi$ and hyperbolic sines of $\phi$, appear and are transformed into cosines and sines of the double angles ($2\theta, 2\phi$), which upon grouping the terms provides the following equations:

$$\begin{pmatrix} R'_1(i,j) \\ \vdots \\ R'_k(i,j) \\ \vdots \\ R'_K(i,j) \end{pmatrix} = C \begin{pmatrix} \sinh(2\varphi) \\ -\sin(2\theta)\cosh(2\varphi) \\ \cos(2\theta)\cosh(2\varphi) \end{pmatrix} = Cv(\theta, \varphi)$$

Wherein $$C = \begin{pmatrix} (\hat{R}_1(i,i) + \hat{R}_1(j,j))/2 & (\hat{R}_1(i,i) - \hat{R}_1(j,j))/2 & \hat{R}_1(i,j) \\ \vdots & \vdots & \vdots \\ (\hat{R}_k(i,i) + \hat{R}_k(j,j))/2 & (\hat{R}_k(i,i) - \hat{R}_k(j,j))/2 & \hat{R}_k(i,j) \\ \vdots & \vdots & \vdots \\ (\hat{R}_K(i,i) + \hat{R}_K(j,j))/2 & (\hat{R}_K(i,i) - \hat{R}_1(j,j))/2 & \hat{R}_K(i,j) \end{pmatrix},$$

The sum of the squares of the non-diagonal elements (i, j) of the resulting matrix product $M(i,j,\theta,\phi)^T \times \hat{R}_k \times M(i,j,\theta,\phi)$ is then equal to the quadratic form $v(\theta,\phi)^T C^T C v(\theta,\phi)$.

It is noted that the vector $v(\theta,\phi)$ describes a hyperboloid defined by $v(\theta,\phi)^T J v(\theta,\phi) = 1$ wherein $J = \text{diag}(-1,1,1)$, The vector $v(\theta,\phi)$ which maximizes the quadratic form $v(\theta,\phi)^T C^T C v(\theta,\phi)$ under the constraint $v(\theta,\phi)^T J v(\theta,\phi) = 1$ is sought: it is well-known that this vector is necessarily one of the three generalized eigenvectors of the matrix pair $(C^T C, J)$ A study of this generalized eigendecomposition shows that this is the generalized eigenvector $v = (x \ y \ z)^T$ corresponding to the smallest positive generalized eigenvalue of $(C^T C, J)$;

$$v(\theta, \varphi) = \begin{pmatrix} \sinh(2\varphi) \\ -\sin(2\theta)\cosh(2\varphi) \\ \cos(2\theta)\cosh(2\varphi) \end{pmatrix} = \begin{pmatrix} x \\ y \\ z \end{pmatrix} = v$$

Finally, in order to calculate the product $M(i,j,\theta,\phi)^T \times \hat{R}_k \times M(i,j,\theta,\phi)$, the optimum values of $\theta$ and $\phi$ are unnecessary; only values of their (conventional and hyperbolic) cosines and sines are needed, which for example are given by:

$$\cosh\varphi = \frac{1}{\sqrt{2}}\sqrt{1 + \sqrt{1+x^2}}$$

$$\sinh\varphi = \frac{x}{2\cosh\varphi}$$

$$\cos\theta = \frac{1}{\sqrt{2}}\sqrt{1 + \frac{z}{\sqrt{1+x^2}}}$$

$$\sin\theta = \frac{-y}{2\cos\theta\sqrt{1+x^2}}$$

The method therefore comprises the iteration of the products:

$$M(i,j,\theta,\phi)^T \times \hat{R}_k \times M(i,j,\theta,\phi)$$

for i<j between 1 and N and this several times until convergence.

The mixture matrix A is then equal to the inverse of $H_L^T(\phi_L) \times G_L^T(\theta_L) \times \ldots \times H_0^T(\phi_0) \times G_0^T(\theta_0)$. Once the mixture matrix A is determined, it is possible to separate the source signals.

An exemplary implantation in Matlab language is given hereafter:

```
function [A,number_of_loops,matrices] = J_Di(matrices,threshold)
%%%%%%%%%%%%%%%%%%%%%%%%%%%%%%%%%%%%%%%%%
%%%%%%%%%%%%%%%%%%%%%%%%%%%%%%%%%%%%%%%%%
%
%   J_Di.m written the 19th of december 2007 by Antoine Souloumiac.
%
%   This software computes the Joint Diagonalisation of a set of
%   matrices.
%
%   input:
%   matrices: array of matrices to be jointly diagonalized
%   threshold: threshold for stop criterion on maximal sines
%
%   outputs:
%   A : estimated mixture matrix
%   number_of_loops: number of loops necessary for convergence
%   matrices: array of matrices after joint diagonalization
%
%%%%%%%%%%%%%%%%%%%%%%%%%%%%%%%%%%%%%%%%%
%%%%%%%%%%%%%%%%%%%%%%%%%%%%%%%%%%%%%%%%%
% initialization
mat_size = size(matrices,1);
nb_mat = size(matrices,3);
A = eye(mat_size);
go_on = 1;
number_of_loops = -1;
% joint dyadization loops
while go_on
    for n=2:mat_size
        for m=1:n-1
            % initialization
            s_max = 0.0;
            sh_max = 0.0;
            % Givens and hyperbolic angles calculation
            C = [ (squeeze(matrices(m,m,:)) + squeeze(matrices(n,n,:)))/2 ...
                  (squeeze(matrices(m,m,:)) - squeeze(matrices(n,n,:)))/2 ...
                  squeeze(matrices(m,n,:)) ];
            [V,D] = eig(C'*C,diag([-1 1 1]));
            % normalisation (-1 1 1) of generalized eigenvectors
            V = V*diag(1./sqrt(abs(diag(V'*diag([-1 1 1])*V))));
            % computation of the medium generalized eigenvalue
            [sortD,index] = sort(diag(D));
            ind_min = index(2);
            v = V(:,ind_min)*sign(V(3,ind_min));
            % computation of trigonometric and hyperbolic cosines and sines
            ch = sqrt( (1+sqrt(1+v(1)^2))/2 );
            sh = v(1)/( 2*ch );
            c = sqrt( ( 1 + v(3)/sqrt(1+v(1)^2) )/2 );
            s = -v(2)/( 2*c*sqrt( 1+v(1)^2 ) );
            % maximal sine and sinh computation for stop test
            s_max = max(s_max,abs(s));
            sh_max = max(sh_max,abs(sh));
            % product of Givens and hyperbolic rotations
            rm11 = c*ch - s*sh;
            rm12 = c*sh - s*ch;
            rm21 = c*sh + s*ch;
            rm22 = c*ch + s*sh;
            % matrices Givens update
            h_slice1 = squeeze(matrices(m,:,:));
            h_slice2 = squeeze(matrices(n,:,:));
            matrices(m,:,:) = rm11*h_slice1 + rm21*h_slice2;
            matrices(n,:,:) = rm12*h_slice1 + rm22*h_slice2;
            v_slice1 = squeeze(matrices(:,m,:));
            v_slice2 = squeeze(matrices(:,n,:));
            matrices(:,m,:) = rm11*v_slice1 + rm21*v_slice2;
            matrices(:,n,:) = rm12*v_slice1 + rm22*v_slice2;
            % dyads Givens update
            col1 = A(:,m);
            col2 = A(:,n);
            A(:,m) = rm22*col1 - rm12*col2;
            A(:,n) = -rm21*col1 + rm11*col2;
        end
    end
    number_of_loops=number_of_loops+1;
    % renormalization of the A columns (equal norm)
    col_norm = sqrt(sum(A.^2,1));
```

-continued

```
d = (prod(col_norm).^(1/mat_size))./col_norm;
A = A.*repmat(d,mat_size,1);
matrices = matrices.*repmat((1./d)'*(1./d),[1 1 nb_mat]);
% stop test
if s_max<threshold & sh_max<threshold
   go_on = 0;
   disp([ 'stop with max sinus and sinh = 
   ' num2str([s_max sh_max]) ])
end
if number_of_loops>100
   go_on = 0;
   warning('maximum number of loops has been reached')
   end
end
```

The calculation complexity has the approximate value of:

number of sweeps×$2KN^3$ wherein:
the number of sweeps is the number of times the iterations are repeated on the whole of the index pairs (i,j),
K is the number of $\hat{R}_k$ matrices, and
N is the size of the $\hat{R}_k$ matrices.

The present invention and the existing algorithms such as FFDiag [4], DNJD [6], LUJ1D [7], etc., have an equivalent computational cost by sweeping equal to $2KN^3$. The advantage of the present invention lies in the number of sweeps. More specifically, with the present method, the number of sweeps may be reduced as compared with known methods of the prior art.

As an example, a comparison of the method according to the present invention (designated hereafter as "J-Di") and of the FFDiag (Ziehe [4]) and LUJ1D (Afsari [7]) methods will be presented in the following: this comparison illustrates the fact that the methods of the prior art have a number of sweeps at least twice as large as those of the method of the present invention.

Moreover, certain methods of the prior art are specialized on particular sets of matrices (Pham [3]: positive definite matrices, Vollgraf [5]: a set containing at least one positive definite matrix). The method according to the invention allows the processing of any types of set of matrices.

Figure 5:
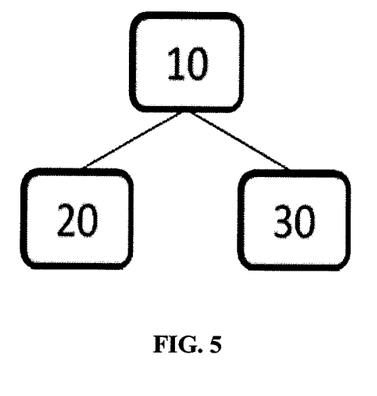
FIG. 5 is a representation of an embodiment of the system for separating mixed signals according to the invention.

FIG. 5 illustrates an embodiment of the system for separating mixed signals according to the present invention. The system comprises processing means 10 (for joint diagonalization in which the mixture matrix A is estimated from a product of rotation matrices corresponding to one or more Givens rotation matrices and to one or more hyperbolic rotation matrices), such as a processor, display means 20, such as a display screen, and inputting means 30, such as a keyboard and a mouse. The system is connected to communication means so as to receive the mixed signals ($x_1(t), \ldots, x_N(t)$) to be processed.

The reader will appreciate that many modifications may be brought to the invention as described above without materially departing from the teachings of the present document.

For example, the product of the Givens rotation (G(θ)) and hyperbolic rotation (H(φ)) matrices may correspond either to the multiplication of a Givens rotation matrix by a hyperbolic rotation matrix, or to the product of a hyperbolic rotation matrix by a Givens rotation matrix.

Consequently, all modifications of this type are intended to be incorporated within the scope of the appended claims.

Annex

With the present annex, the method described above may be better understood. Certain notations used earlier may possibly differ in the following. In any case, the changes in notation will be specified in order to facilitate understanding by the reader.

I. ABSTRACT

A new algorithm for computing the non-orthogonal joint diagonalization of a set of matrices is proposed for independent component analysis and blind source separation applications.

This algorithm is an extension of the Jacobi-like algorithm first proposed in the Joint Approximate Diagonalization of Eigenmatrices (JADE) method for orthogonal joint diagonalization. The improvement consists mainly in computing a mixing matrix of determinant one and columns of equal norm instead of an orthogonal mixing matrix. This target matrix is constructed iteratively by successive multiplications of not only Givens rotations but also hyperbolic rotations and diagonal matrices. The algorithm performance, evaluated on synthetic data, compares favorably with existing methods in terms of speed of convergence and complexity.

II. INTRODUCTION

Joint diagonalization algorithms are used for blind source separation (BSS) and independent component analysis (ICA) applications.

In these applications, one aims at separating independent signals (the sources) that were mixed instantaneously, i.e. without temporal convolution, by a matrix A observing only the mixtures and without any other prior information than the statistical independence of the sources.

Many BSS methods like [1], [1b], [2], [3], [4], [5], [11] contain a joint diagonalization step of a set R of K symmetric matrices $R_1, \ldots, R_k, \ldots R_K$ of size N×N. According to the application at hand and the corresponding expected properties of the source signals, the considered matrices $R_k$ are for instance covariance matrices estimated on different time windows, third or fourth ([1], [1b]) or higher order cumulants slices, or inter-correlation matrices with time shifts [2], etc. All these matrices share the common structure $$R_k = AD_k A^T \quad (1)$$

where A is the mixing matrix and the $D_k$ are diagonal matrices. Under these conditions, the separation matrix defined by $B \triangleq A^{-1}$ is characterized by the property of diagonalizing every $R_k$ i.e. $BR_k B^T = D_k$ for 1≤k≤K. Under weak assumptions and up to the permutation and scaling indeterminations, this property is sufficient for estimating the separation matrix, or equivalently the mixing matrix, by a joint diagonalization procedure of the $R_k$ matrices. In practice, the $R_k$ matrices are corrupted by some estimation error and A (or B) is efficiently estimated via an approximate joint diagonalization of the set R.

Besides, the first joint diagonalization techniques, like JADE [1], [1b] or SOBI [2] for instance, require the positive definiteness of one matrix in R, generally the covariance matrix of the mixed sources (without noise). In this context, it is then possible to pre-whiten the mixed sources, which reduces the joint diagonalization problem to computing an orthogonal (or unitary in the complex case) mixing matrix. Unfortunately, this pre-whitening step is never exact due to the estimation error in the covariance matrix of the mixed sources. This preliminary error cannot be corrected by the Orthogonal Joint Diagonalization (OJD) that follows. As a consequence, many authors developped Non-Orthogonal Joint Diagonalization (NOJD) methods to avoid pre-whitening. These optimization methods address sets of positive definite matrices [3], or sets containing one positive definite matrix like QDiag [12], [5] or, eventually, any set of matrices [11], [4], [7]).

A new non-orthogonal joint diagonalization algorithm is proposed for any set of matrices for application to BSS and ICA based on an algebraic approach that enjoys the good convergence properties of Jacobi techniques like JADE. To obtain this result, the mixing matrix A is also constructed by multiplication of elementary matrices. But as A is not orthogonal, it is necessary to define a new multiplicative group that contains the group of orthogonal matrices as a sub-group, and a new set of elementary matrices that generalizes the Givens rotations. This can be achieved by iteratively building a mixing matrix of determinant equal to one and whose columns are of equal norm by successive multiplications of Givens rotations, hyperbolic rotations and diagonal matrices.

Hereafter in the third section, the constraints of determinant and column norm of the mixing matrix and their consequences on NOJD problem indeterminations are investigated.

In the fourth section, it is shown how a matrix of determinant one can be generated as a product of Givens rotations, hyperbolic rotations and diagonal matrices.

The new non-orthogonal approximate Joint Diagonalization algorithm, called J-Di for Joint-Diagonalization, is described in the fifth section and its performance is evaluated on synthetic data in section six. In particular simulations are provided on large sets of large matrices, for instance 200 matrices of size 200×200. This is interesting for applications as electro-encephallograms processing where the number of electrodes reaches 128 or 256.

Finally, a short complexity comparison with the recent algorithm proposed by Wang, Liu and Zhang in [6] is added.

III. MATRICES OF DETERMINANT EQUAL TO ONE AND COLUMNS OF EQUAL NORM

III.A. Properties

It is assumed that any regular square mixing matrix A in model (1) has determinant equal to one and columns of equal norm. As a matter of fact, it is always possible to insert in (1) a regular diagonal matrix $D_A$ $$R_k = AD_k A^T = (AD_A)(D_A^{-1} D_k D_A^{-1})(AD_A)^T \quad (2)$$

The matrices $D_A^{-1} D_k D_A^{-1}$ are obviously diagonal and $D_A$ can be tuned such that $AD_A$ verifies the required determinant and column norm properties. It is sufficient to consider $$D_A = \rho \begin{pmatrix} \frac{\text{sign}(\det(A))}{\|a_1\|} & 0 & \cdots & 0 \\ 0 & \frac{1}{\|a_2\|} & \cdots & 0 \\ \vdots & \vdots & \ddots & \vdots \\ 0 & 0 & \cdots & \frac{1}{\|a_N\|} \end{pmatrix} \quad (3)$$

with $$\rho = \sqrt[N]{\frac{\|a_1\| \|a_2\| \cdots \|a_N\|}{|\det(A)|}} \quad (4)$$

where $a_n$ is the n-th column of A and $\|a_n\|$ its Euclidean norm. These constraints on the mixing matrix provide a kind of normalization that is useful for numerical accuracy. In particular, the condition number of $AD_A$ is often smaller than the condition number of A but this is not a general rule.

III.B. Uniqueness Conditions and Indeterminations of the Mixing Matrix

As described in [9], [10], there is a unique solution to the NOJD problem if and only if there are no colinear columns in the matrix D resulting from the vertical concatenation of the $D_k$ diagonals (D is K×N and its (k, n) entry is the n-th diagonal entry of $D_k$). If $\rho_{nm}$ is the absolute value of the cosine of the D n-th and m-th columns angle and $\rho \triangleq \max_{n,m} \rho_{nm}$, then the uniqueness condition can be simply be reformulated as: $\rho < 1$. This parameter $\rho$, called the modulus of uniqueness, is also an indicator of the difficulty of an NOJD problem with the obvious rule: the closer $\rho$ is to 1, the more difficult is the NOJD.

It will be understood that a "unique solution" of the NOJD problem is only "unique" up to the classical permutation and scale indeterminations of the columns of the mixing matrix. The unity determinant and equal column norm properties (of the present invention) slightly change these indeterminations. As a matter of fact, it is easy to show that the permutation indetermination remains but that the scale indetermination reduces to a sign indetermination. More precisely, an even number of the mixing matrix columns can be multiplied by −1.

IV. A NEW CLASS OF ELEMENTARY MATRICES TO SPAN THE SPECIAL LINEAR GROUP

The goal of this section is to propose sets of elementary matrices which generate the set A(R,N) and the group SL(R, N) by repeated multiplications.

IV.A. Unique Decomposition in A(R, 2)

Consider a matrix A in A(R, 2) (det(A)=1 and $\|a_1\|=\|a_2\|$) and its polar decomposition $A \triangleq GH$ where G is orthogonal and H is symmetric positive. As the determinants of A and H are both positive, the determinant of G is equal to plus one and G is necessarily a Givens rotation $G(\theta)$ with $$G(\theta) \triangleq \begin{pmatrix} \cos\theta & -\sin\theta \\ \sin\theta & \cos\theta \end{pmatrix} \quad (5)$$

It will be shown now that H, whose determinant is also equal to plus one, is actually a hyperbolic rotation.

Denote e, f and g the entries of H $$H \triangleq \begin{pmatrix} e & f \\ f & g \end{pmatrix} \quad (6)$$

$H = G(-\theta)A$ has columns of equal norm like A. Therefore $e^2 + f^2 = f^2 + g^2$, H is positive by construction, hence e>0 and g>0 and e=g. The determinant of H is equal to 1, then $e^2 - f^2 = 1$ and there is a unique angle $\phi$ such that $e = \cosh(\theta)$ and $f = \sinh(\phi)$. Finally $H = H(\phi)$ with $$H(\varphi) \triangleq \begin{pmatrix} \cosh\varphi & \sinh\varphi \\ \sinh\varphi & \cosh\varphi \end{pmatrix} \quad (7)$$

In conclusion, any matrix of A(R, 2) can be decomposed in a unique product of a Givens and a hyperbolic rotation.

IV.B. Multiple Solutions in SL(R, 2)

Any matrix F in SL(R, 2) can be uniquely decomposed in the product of a matrix A in A(R, 2) multiplied by a 2-by-2 diagonal matrix $D(\lambda)$ with $$D(\lambda) \triangleq \begin{pmatrix} \lambda & 0 \\ 0 & 1/\lambda \end{pmatrix} \quad (8)$$

and $\lambda = \sqrt{\|f_1\|/\|f_2\|}$ where $f_1, f_2$ are the columns of F and $\|f_1\|, \|f_2\|$ their norms. The matrix A can be decomposed in a product of a Givens and a hyperbolic rotation as shown in the previous section.

Finally, there are two unique angles: $\theta$ between $-\pi$ and $+\pi$ and $\phi$ in R, and a unique positive real number $\lambda$ such that $$F = G(\theta)H(\phi)D(\lambda) \quad (9)$$

Further decompositions can be derived from the singular value decomposition (SVD) of $F \triangleq USV^T$.

Necessarily det(S)=1 and det(U)=det(V)=±1. But note that it is always possible to change the sign of the first column (or line) of U and V so that det(U)=det(V))=+1. This proves that both U and V can be chosen as Givens rotations: $U = G(\theta_1)$ and $V = G(\theta_2)$. Obviously, $S = D(s_1)$ where $s_1 > 0$ is the first S singular value. The following expression is finally obtained $$F = G(\theta_1)D(s_1)G(\theta_2)^T \quad (10)$$

In addition, the eigenvalue decomposition (EVD) of any hyperbolic rotation $H(\phi)$ gives $$H(\phi) = G(\pi/4)D(e^\phi)G(\pi/4)^T \quad (11)$$

and consequently $$F = G(\theta_1 - \pi/4)H(\log s_1)G(\theta_2 - \pi/4)^T \quad (12)$$

These decompositions prove that any matrix of SL(R, 2) can be generated by multiplying Givens rotations and diagonal matrices, or Givens rotations and hyperbolic rotations. In addition, the diagonal matrices can be used to normalize the columns of any matrix in SL(R, 2) to get a matrix of A(R, 2). These results can be extended to dimension N.

IV.C. The Extension to SL(R,N)

The following notation is firstly introduced.

For any $i < j \in \{1, \ldots, N\}$ $G(\theta,i,j)$ denotes the classical Givens rotation $$G(\theta, i, j) \triangleq \begin{pmatrix} I_{i-1} & \vdots & 0 & \vdots & 0 \\ \cdots & \cos\theta & \cdots & -\sin\theta & \cdots \\ 0 & \vdots & I_{j-i-1} & \vdots & 0 \\ \cdots & \sin\theta & \cdots & \cos\theta & \cdots \\ 0 & \vdots & 0 & \vdots & I_{N-j} \end{pmatrix} \quad (13)$$

$H(\phi, i, j)$ is the corresponding hyperbolic rotation $$H(\varphi, i, j) \triangleq \begin{pmatrix} I_{i-1} & \vdots & 0 & \vdots & 0 \\ \cdots & \cosh\varphi & \cdots & \sinh\varphi & \cdots \\ 0 & \vdots & I_{j-i-1} & \vdots & 0 \\ \cdots & \sinh\varphi & \cdots & \cosh\varphi & \cdots \\ 0 & \vdots & 0 & \vdots & I_{N-j} \end{pmatrix} \quad (14)$$

and $D(\lambda, i, j)$ denotes the following diagonal matrix $$D(\lambda, i, j) \triangleq \begin{pmatrix} I_{i-1} & \vdots & 0 & \vdots & 0 \\ \cdots & \lambda & \cdots & 0 & \cdots \\ 0 & \vdots & I_{j-i-1} & \vdots & 0 \\ \cdots & 0 & \cdots & 1/\lambda & \cdots \\ 0 & \vdots & 0 & \vdots & I_{N-j} \end{pmatrix} \quad (15)$$

Very similarly to the N=2 case, we use the SVD $F \triangleq USV^T$ of a matrix F in SL(R,N) is used. The determinant of the orthogonal matrices U and V can be chosen equal to plus one by changing the sign of the first column of U and V. It is well known that every orthogonal matrix of determinant one (in SO(R,N)) can be decomposed in the product of Givens rotations. By construction S is diagonal, positive definite and its determinant is equal to plus one (the product of the singular values $s_1, s_2, \ldots, s_N$ is equal to one). One can also show that $$S = D(s_1,1,2)D(s_1s_2,2,3)\ldots D(s_1s_2\ldots s_{N-1},N-1,N) \quad (16)$$

In addition, the $D(\lambda, i, j)$ matrices can be transformed in the product of Givens and hyperbolic rotations like in the two-dimensional case. Finally the same conclusions hold in SL(R, N) as in SL(R, 2): every matrix in SL(R,N) can be generated by multiplying Givens rotations and diagonal matrices, or Givens and hyperbolic rotations. The diagonal matrices can be used to normalize the columns of any matrix in SL(R,N) to get a matrix in A(R,N).

It will be seen in the next section that the parameters of the three elementary matrices described above can be easily optimized in the NOJD context.

V. THE J-DI ALGORITHM

In this section, it is described how to construct the unknown matrix A of determinant equal to one and columns of equal norm as a product of the elementary matrices $G(\theta, i, j)$, $H(\phi, i, j)$ and $D(\lambda, i, j)$ by jointly diagonalizing the set $R = \hat{R}_1, \ldots, \hat{R}_k, \ldots, \hat{R}_K$ corresponding to estimations of the exact matrices of $R_1, \ldots R_k, \ldots R_K$.

More precisely, matrices $G(\theta, i, j)$ and $H(\phi, i, j)$ are used to minimize off-diagonal entries, while $D(\lambda, i, j)$ matrices are used to normalize the columns.

V.A. Optimization of the Parameters $\theta$ and $\phi$ to Minimize the (i, j) Off-Diagonal Entries For $k=1, \ldots, K$ denote by $R'_k$ the matrix obtained by updating $\hat{R}_k$ in the following way $$R'_k = H^T(\phi,i,j) \times G^T(\theta,i,j) \times \hat{R}_k \times G(\theta,i,j) \times H(\phi,i,j) \quad (17)$$

It is proposed to minimize the sum of the squares of the (i, j)-entries, denoted R'$_k$[i, j], of the K matrices R'$_k$ i.e.

$$(\theta_{opt}, \varphi_{opt}) \triangleq \underset{\theta,\varphi}{\operatorname{argmin}} \sum_{k=1}^{k=K} R'_k[i, j]^2 \quad (18)$$

Minimizing this quantity is not equivalent to minimizing all the off-diagonal entries or a global cost function like in JADE. Nevertheless, the performance evaluation below will show that this iterated local minimization actually jointly diagonalizes the matrix set R. After some manipulations, one can see that $$\begin{pmatrix} R'_1(i,j) \\ \vdots \\ R'_k(i,j) \\ \vdots \\ R'_K(i,j) \end{pmatrix} = C \begin{pmatrix} \sinh(2\varphi) \\ -\sin(2\theta)\cosh(2\varphi) \\ \cos(2\theta)\cosh(2\varphi) \end{pmatrix} = Cv(\theta, \varphi) \quad (19)$$

Where $$C = \begin{pmatrix} (\hat{R}_1(i,i)+\hat{R}_1(j,j))/2 & (\hat{R}_1(i,i)-\hat{R}_1(j,j))/2 & \hat{R}_1(i,j) \\ \vdots & \vdots & \vdots \\ (\hat{R}_k(i,i)+\hat{R}_k(j,j))/2 & (\hat{R}_k(i,i)-\hat{R}_k(j,j))/2 & \hat{R}_k(i,j) \\ \vdots & \vdots & \vdots \\ (\hat{R}_K(i,i)+\hat{R}_K(j,j))/2 & (\hat{R}_K(i,i)-\hat{R}_K(j,j))/2 & \hat{R}_K(i,j) \end{pmatrix}, \quad (20)$$

Note that the squaring of the coefficients of G and H in R'$_k$ is transformed in double (trigonometric and hyperbolic) angles. The sum of squares of the R'k [i, j] is equal to $v(\theta,\phi)^T C^T C v(\theta,\phi)$. Hence the minimization in (18) becomes $$(\theta_{opt}, \varphi_{opt}) \triangleq \underset{\theta,\varphi}{\operatorname{argmin}} v(\theta, \varphi)^T C^T C v(\theta, \varphi) \quad (21)$$

where the vector $v(\theta,\phi)$ is normalized not in the Euclidean norm but in a hyperbolic norm. As a matter of fact, we have $-v_1(\theta, \phi)^2 + v_2(\theta,\phi)^2 + v_3(\theta, \phi)^2 = 1$, i.e. $v(\theta,\phi)^T J v(\theta,\phi)=1$ with J=diag(−1,1,1).

One can prove that the whole hyperboloid defined by $v(\theta,\phi)^T J v(\theta,\phi)=1$ is spanned by $v(\theta,\phi)$ with $-\pi/2 \leq \theta \leq \pi/2$, and $\phi$ in R. In other words, the minimization of the quadratic quantity $v^T C^T C v$ under the quadratic constraint $v^T J v=1$ is achieved. The solution v is known to be a generalized eigenvector of $(C^T C, J)$, i.e. v is such that $C^T C v = \delta_v J v$ where $\delta_v$ is the generalized eigenvalue of v.

This generalized eigen decomposition is studied hereafter. Denote V the 3×3 matrix whose columns are the generalized eigenvectors and Δ the diagonal matrix of the generalized eigenvalues of $(C^T C, J)$, then $C^T C V = J V \Delta$ and therefore $V^T C^T C V = V^T J V \Delta$. It is known that $V^T J V$ is diagonal and has one negative and two positive diagonal entries (Sylvester law of inertia) like J. As $C^T C$ is positive, Δ has the same inertia as J and there are:
 one generalized eigenvector with a negative generalized eigenvalue and a negative J-norm $v^T J v = -1$, and
 two generalized eigenvectors with positive generalized eigenvalues and positive J-norm $v^T J v = +1$.

The generalized eigenvector we are looking for is such that $v^T J v$ is equal to +1 and that $v^T C^T C v$ is minimal, which means that it corresponds to the smallest positive generalized eigenvalue of $(C^T C, J)$.

In summary, the optimal Givens and hyperbolic angles θ and φ are defined by the equation $$v(\theta, \varphi) = \begin{pmatrix} \sinh(2\varphi) \\ -\sin(2\theta)\cosh(2\varphi) \\ \cos(2\theta)\cosh(2\varphi) \end{pmatrix} = \begin{pmatrix} x \\ y \\ z \end{pmatrix} = v$$

where $v=(x,y,z)^T$ is the generalized eigenvector of $(C^T C, J)$ of the smallest positive eigenvalue.

Since an eigenvector is determined up to its sign, it is always possible to choose v such that z>0 i.e. such that cos 2θ is positive. Besides, the expression (17) is invariant when θ is replaced with θ+π.

Hence θ can be chosen between −π/2 and −π/2 such that cos(θ)>0. Thus, it can assume that both cos θ and cos 2θ are positive, which is equivalent to assuming −π/4≤θ≤π/4.

Note that the explicit expression of the angles θ and φ is not necessary. Only the computation of cos h φ, sin h φ, cos θ and sin θ is necessary to implement the update (17). Simple trigonometry gives immediately the following solutions of (22)

$$\cosh\varphi = \frac{1}{\sqrt{2}}\sqrt{1+\sqrt{1+x^2}} \quad (23)$$

$$\sinh\varphi = \frac{x}{2\cosh\varphi} \quad (24)$$

$$\cos\theta = \frac{1}{\sqrt{2}}\sqrt{1+\frac{z}{\sqrt{1+x^2}}} \quad (25)$$

$$\sin\theta = \frac{-y}{2\cos\theta\sqrt{1+x^2}} \quad (26)$$

At this stage, a method for globally minimizing the R'$_k$ [i, j] for a given couple of indices 1≤i≤j≤N with a Givens rotation G(θ, i, j) and a hyperbolic rotation H(φ, i, j) is known. Once these optimal angles θ and φ are computed, every matrix of the set R is updated by (17) which can be achieved by computing only two linear combinations of the lines or the columns i and j of R$_k$.

The mixing matrix, initialized at the N×N identity, is updated by $$A' = AG(\theta, i, j)^{-T} H(\varphi, i, j)^{-T} \quad (27)$$

$$= AG(\theta, i, j)H(-\varphi, i, j) \quad (28)$$

in order to conserve $AR_k A^T = A'R'_k A'^T$.

After an update, the norm of the columns of A are no longer equal and can be re-normalized with matrices D(i, j, λ). It is explained in the next section that it is not necessary to carry out this normalization at each step. The R$_k$ and A updates are repeated for each pair of indices (1, j) with 1≤i<j≤N like in the Jacobi algorithm [8]. A complete updating over the N(N−1)/2 pairs of indices is called a sweep. Similarly to the classical Jacobi algorithms, several sweeps are generally necessary until complete convergence.

V.B. Details of Implementation

Other sequences of rotations could be imagined. As the Givens rotations are orthogonal, they generate less roundoff noise than the hyperbolic rotations. So, one could for instance begin the joint diagonalization by several sweeps of pure Givens rotations updates (i.e. JADE sweeps) before using the non-orthogonal hyperbolic rotations. This precaution was not necessary in our numerical experiments, even for badly conditioned mixing matrices (condition number up to 100000). The loss of numerical accuracy is probably linked to the hyperbolic rotations with a large angle φ: these events could also be monitored.

The JADE or SOBI pre-whitening is not necessary but can still be used for improving numerical accuracy if R contains a positive definite matrix. In BSS applications, the reduction of the data to the subspace of few principal components can obviously be computed if the prior knowledge that the number of sources is smaller than the number of sensors is known.

The expressions (23), (24), (25), (26) are not the only possible inversion formulae of (22). They have been chosen for their good numerical accuracy when v1 and v2 converge to 0. A better choice possibly exists. When close to convergence, the matrices C and $C^T C$ are close to singularity. Then the generalized eigen decomposition of $(C^T C, J)$ can be numerically difficult and sometimes the target generalized eigenvector no longer corresponds to the smaller positive generalized eigenvalue but to a very small negative eigenvalue. To avoid selecting the erroneous larger positive eigenvalue, it is preferable to choose the eigenvector associated with the median generalized eigenvalue instead of the smaller positive one.

It is implemented in the following simulations. Other solutions like discarding the update if the eigenvalue signs are not correct (+,+,−) or developping a specific procedure to compute only the target eigenvector could be investigated.

It is observed in the simulations that the normalization of the columns of A is not necessary at each step but may be performed only once per sweep. It is simply achieved by multiplying A at the right by a diagonal matrix $D_A$ and the $R_k$ by $D_A^{-1}$ on both sides (similarly to equations (2) and (3)) with $$D_A = \sqrt[N]{\|a_1\|\|a_2\|\cdots\|a_N\|} \begin{pmatrix} \frac{1}{\|a_1\|} & 0 & \cdots & 0 \\ 0 & \frac{1}{\|a_2\|} & \cdots & 0 \\ \vdots & \vdots & \ddots & \vdots \\ 0 & 0 & \cdots & \frac{1}{\|a_N\|} \end{pmatrix} \quad (29)$$

where $a_n$ is the n-th column of A and $\|a_n\|$ its Euclidean norm.

The cost of this normalization ($2KN^2$) at each sweep is negligible compared to the update (17) of $R_k$ ($2KN^3$). In view of the simulations, the present invention still converges without any normalization of the columns' norm.

Several stop criteria can be imagined like monitoring the norm of off-diagonal terms and detecting its stabilization at a minimal value. For instance in the present case, it is chosen to stop the iterations when all the trigonometric and hyperbolic sines of a sweep are very small (a threshold between $10^{-20}$ and $10^{-25}$ seems relevant for exactly diagonalizable matrices and computations in Matlab double precision; this value has to be increased between $10^{-10}$ and $10^{-20}$ for non-exactly diagonalizable sets).

V.C. Summary of the J-Di Algorithm

The numerical simulations of the next section implement the following version of J-Di.
Require: K symmetric N×N matrices R1, . . . RK and a threshold τ

```
A ← I_N
while max_{i,j}(|sinhφ|,|sinθ|) > τ do
    for all i,j such that 1 ≤ i < j ≤ N do
        build C as in (20)
        compute the eigenvector v ≜ (v_1,v_2,v_3)^T of
        (C^T C,diag(−1,1,1)) of median eigenvalue
        if v_3 < 0 then
            v ← −v
        end if
        compute coshφ and sinhφ as in (23) and (24)
        compute cosθ and sinθ as in (25) and (26)
        for k = 1 to K do
            R_k ← H(φ,i,j)G(−θ,i,j)R_k G(θ,i,j)H(φ,i,j)
            A ← AG(θ,i,j)H(−φ,i,j)
        end for
    end for
    compute D_A as in (29)
    A ← AD_A
    for k = 1 to K do
        R_k ← D_A^{-1} R_k D_A^{-1}
    end for
end while
```

The computational cost of the algorithm is mainly the cost of updating the $R_k$ matrices for each pair of indices i and j, i.e. the cost of (17). By using the sparsity of G and H and the symmetry of the $R_k$, the cost of this update can be reduced to 4KN flops. For one sweep over the N(N−1)/2 pairs of indices, the cost is then roughly $2KN^3$. The number of sweeps to be made until convergence depends on the size and the difficulty of the NOJD problem at hand as described in the next section.

V.D. Short Comparison with Afsari Algorithms

Several similarities between J-Di and the four algorithms proposed in [7] deserve to be emphasized.

Both methods construct the diagonalizer as a product of planar transformations: Givens rotations and triangular matrices in QRJ1D and QRJ2D, or only triangular matrices in LUJ1D and LUJ2D methods, and Givens rotations and hyperbolic rotations in the case of J-Di. In all cases, the determinant of these transformations is one and their product spans the special linear group.

LUJ1D, LUJ2D, QRJ1D and QRJ2D minimize global cost functions, J-Di minimizes a local cost function for each current pair of indices (i; j), For each pair of indices the two angles are simultaneously optimized by J-Di whereas the two optimizations are independent in LUJ1D, LUJ2D, QRJ1D and QRJ2D.

In view of (necessarily) limited simulations, LUJ1D, LUJ2D, QRJ1D and QRJ2D seem to converge linearly and J-Di quadratically.

The computational costs per sweep are identical (if grouping the two (i; j)-updates).

LUJ1D is selected for the comparison in the next section because it seems faster in the specific simulated contexts.

VI. PERFORMANCE EVALUATION ON NUMERICAL SIMULATIONS

The method according the present invention (i.e. J-Di) is compared to FFDiag [4] and LUJ1D [7] because these two last NOJD algorithms do not require the positive definiteness of any matrix of R.

One iteration (called sweep below) of the FFDiag algorithm has approximatively the same complexity ($2KN^3$ for updating R) than one J-Di or LUJ1D sweep. Therefore, the only thing which will be compared is the number of sweeps necessary for convergence.

Nevertheless, the operations are structured differently within one sweep: J-Di and LUJ1D require $N(N-1)/2$ very sparse updates of R whereas FFDiag requires only a complete dense update.

This difference probably makes a FFDiag sweep slightly faster than a J-Di or LUJ1D sweep when implemented in an interpreted language like Matlab. But an implementation in C for instance should show similar execution times.

Two different criteria of performance are defined and measured first on a set of exactly diagonalizable matrices and second on a set of approximatively diagonalizable matrices. The simulations are run in Matlab double precision.

VI.A. Criteria of Performance for Non-Orthogonal Joint Diagonalization

Two ways of measuring the quality of a joint diagonalization are used below. The first criterion consists in computing the ratio of the off-diagonal norm, defined as the sum of the squared off-diagonal entries of R, and the diagonal norm, defined as the sum of the squared diagonal entries of R. This non-standard normalization is useful since the diagonal norm is not constant during the first sweeps.

A second criterion is necessary to assess the quality of the estimation of the mixing matrix and the corresponding separation performance. As a matter of fact, the inverse of the estimated mixing matrix $\hat{A}$ is the optimal spatial filter (in the absence of additive noise) for separating the sources mixed by A.

The closer the product $\hat{A}^{-1}A$ is to a permutation matrix $\Pi$ times a diagonal matrix D, the better is the separation. Therefore, it is natural to measure the quality of separation by computing the distance between $P \triangleq \hat{A}^{-1}A$ and the closest product $\Pi D$ of a permutation and a diagonal matrix.

In BSS, it is standard to use the index of performance $I(P)$ defined by $$I(P) \triangleq \frac{1}{2N(N-1)} \sum_{n=1}^{n=N} \left( \sum_{m=1}^{m=N} \frac{|P_{nm}|}{\max_k |P_{nk}|} - 1 \right) + \frac{1}{2N(N-1)} \sum_{m=1}^{m=N} \left( \sum_{n=1}^{n=N} \frac{|P_{nm}|}{\max_k |P_{km}|} - 1 \right) \quad (30)$$

even if it is not a perfect distance to $\Pi D$. The normalization term $1/2N(N-1)$ has been chosen so that $I(P)$ is equal to $\alpha$ for $0 \le \alpha < 1$ when P is a matrix with diagonal entries equal to ones and off-diagonal entries equal to $\alpha$. Hence $I(P)$ gives the order of magnitude of the relative amplitude of interferences in the separated sources (cross-talk index).

VI.B. Exactly Diagonalizable Matrix Set

The mixing matrix entries are independent normally distributed, its determinant is set to 1 and its columns are normalized to the same norm using the equation (3). Those random mixing matrices generally have a condition number smaller than $10^4$ or $10^5$, rarely more as shown in the following figures. A more specific validation of the J-Di algorithm should be done for applications involving worse-conditioned mixing matrices. The diagonal entries of the $D_k$ matrices are also chosen from a standard normal distribution. Note that this way of generating the $D_k$ determines the distribution of the modulus of uniqueness which only depends on K and N. The $R_k$ are computed by $R_k = AD_kA^T$.

Figure 2:
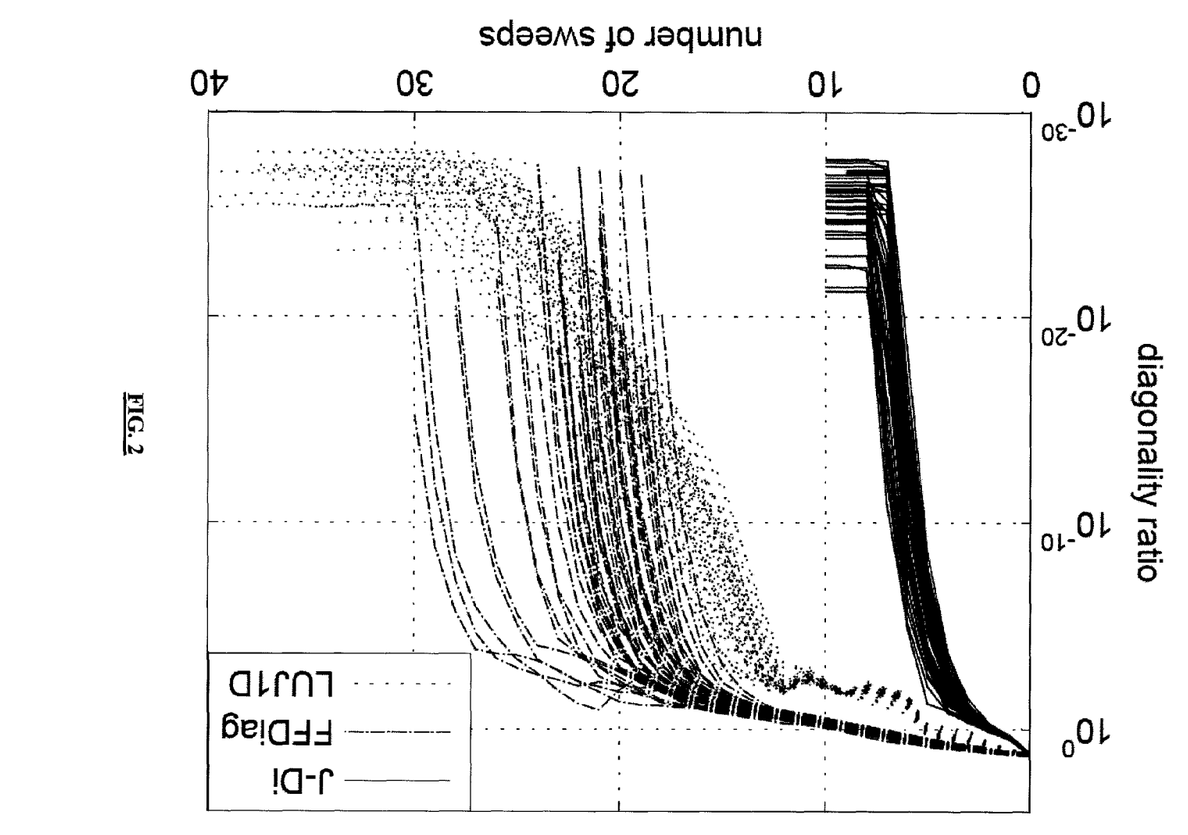
FIG. 2 is a diagram illustrating the convergence toward diagonality as a function of a number of sweeps with 50 independent trials with sets of K=50 matrices of size N=50 for three different methods (J-Di, FFDiag and LUJ1D) for separating mixed signals.

1) Quadratic Convergence:

The diagonality ratios of the J-Di, FFDiag and LUJ1D algorithms are computed after each sweep until convergence and are plotted in FIG. 2 for N=K=50 and 50 independent trials. In this case, the modulus of uniqueness is small almost always between 0.4 and 0.6.

Figure 3:
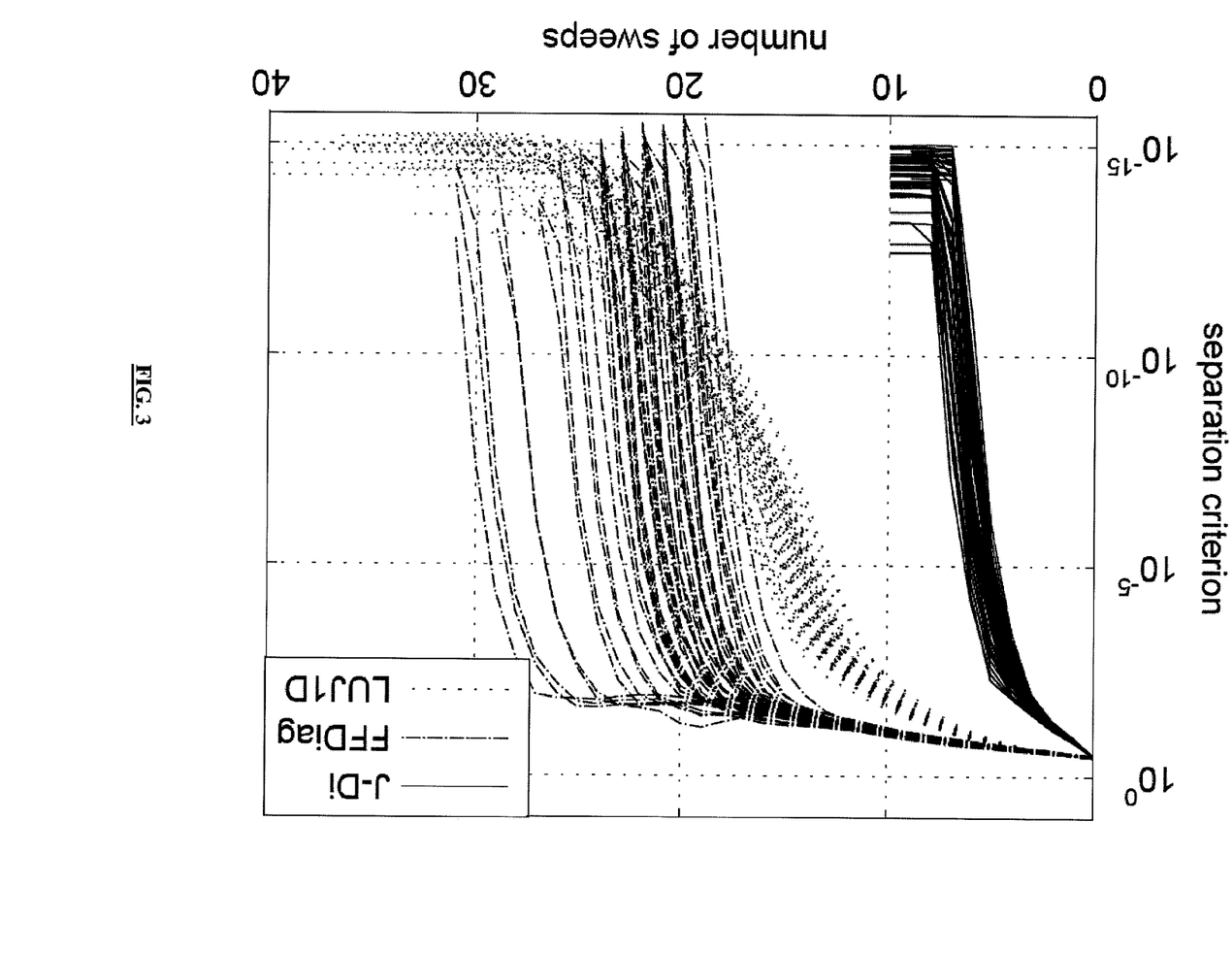
FIG. 3 is a diagram illustrating the convergence of the separation criterion as a function of a number of sweeps with 50 independent trials with sets of K=50 matrices of size N=50 for three different methods (J-Di, FFDiag and LUJ1D) for separating mixed signals.

The separation criterion is plotted in FIG. 3 under the same conditions.

These results indicate that FFDiag and J-Di algorithms seem to have (at least) quadratic convergence but that J-Di requires less sweeps. In spite of a final linear convergence LUJ1D shows intermediate performance.

2) Influence of the Matrix and Set Sizes on the J-Di Convergence Speed:

For different mixing matrices and different set sizes (N=K=5, 10, 20, 50, 100 and 200), the number of sweeps necessary to reach convergence of J-DI DI is counted and its distribution for 100 independent trials is given in the following table:

|  | ≤4 | 5 | 6 | 7 | 8 | 9 | 10 | ≥11 |
|---|---|---|---|---|---|---|---|---|
| N = K = 5 | 1 | 86 | 13 | 0 | 0 | 0 | 0 | 0 |
| N = K = 10 | 0 | 5 | 81 | 14 | 0 | 0 | 0 | 0 |
| N = K = 20 | 0 | 0 | 27 | 65 | 7 | 1 | 0 | 0 |
| N = K = 50 | 0 | 0 | 0 | 48 | 47 | 5 | 0 | 0 |
| N = K = 100 | 0 | 0 | 0 | 11 | 74 | 12 | 3 | 0 |
| N = K = 200 | 0 | 0 | 0 | 2 | 43 | 41 | 11 | 3 |

It can be seen that the J-Di number of sweeps increases with the matrix size but remains roughly smaller than 10 even for large sets (K=200) of large matrices (N=200).

VI.C. Non-Exactly Diagonalizable Sets of Matrices: Application to Blind Source Separation The performance of the J-Di, FFDiag and LUJ1D non-orthogonal joint diagonalization algorithms is compared on non-exactly diagonalizable sets of matrices.

To evaluate the method according the present invention (J-Di) on a set of matrices that are neither positive (like covariance matrices) nor negative, a set of fourth-order cumulant slices is chosen.

Consider the classical BBS model: $x = As + n$ where x, s and n are respectively the N-dimensional vectors of observed mixtures, sources and additive Gaussian noise, and A is the N×N mixing matrix. The considered matrix set R contains the $K = N(N+1)/2$ matrices $R_{mn}$ of size N×N defined by $$R_{mn} \triangleq \text{Cum}(:,:,x_m,x_n) \quad (31)$$

for all m and n such that $1 \le m \le n \le N$ and where $x_n$ denotes the n-th entry of x.

It is considered N=20 sources and therefore $K = N(N-1)/2 = 210$ cumulant slices (matrices) of size 20×20. The samples of source signals are independent and uniformly distributed between $-\sqrt{3}$ and $\sqrt{3}$ to get non-Gaussian, zero-mean and unity-variance signals. The standard deviation of the additive zero-mean Gaussian noise $\sigma$ is first set to zero and second set to $\sigma = 0.1$. The cumulants are estimated on 100000 independent samples. In these cases, the number of matrices K is large enough such that the modulus of uniqueness is small, generally between 0.3 and 0.6. It explains why this parameter does not seem to influence the performance in the simulations and is therefore not presented.

Figure 4:
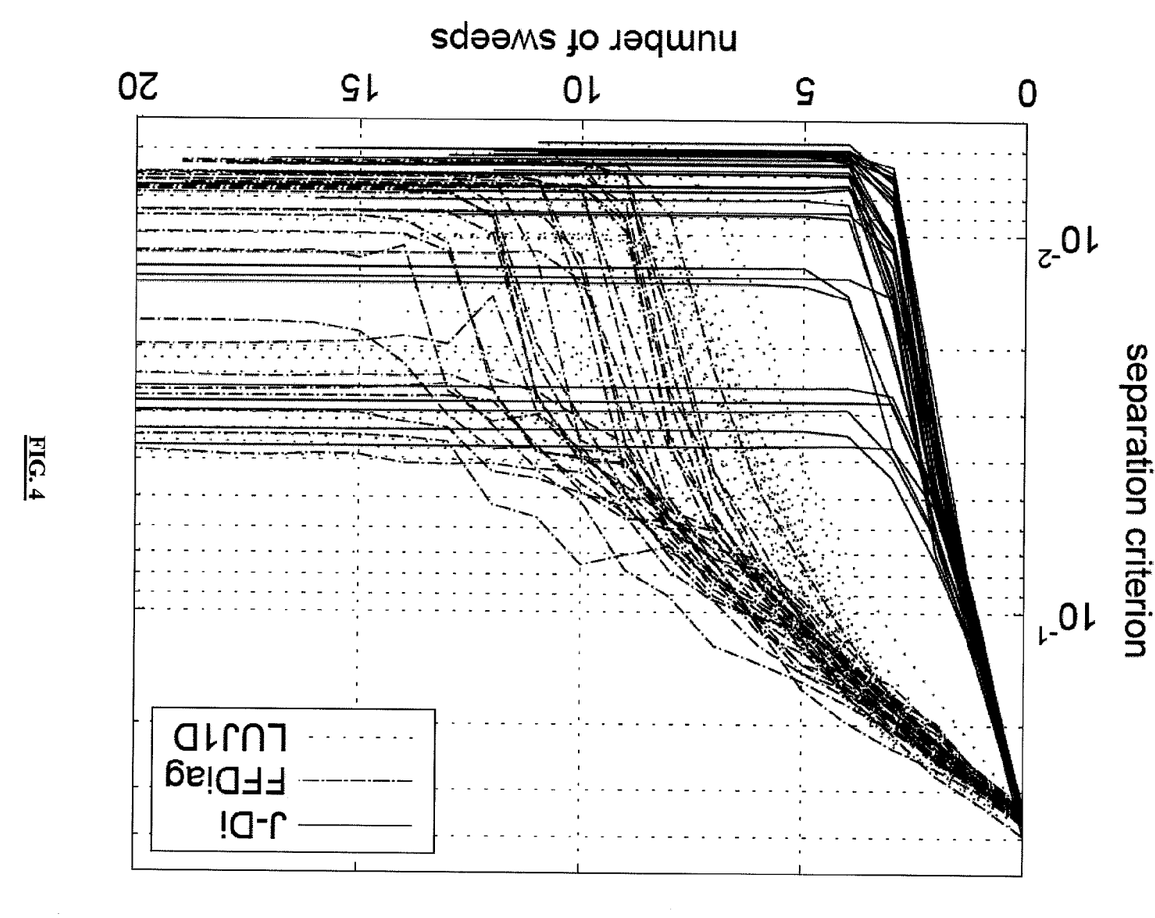
FIG. 4 is a diagram illustrating the convergence of the separation criterion as a function of a number of sweeps with 50 independent trials, K=N(N+1)/2=210 fourth order cumulant slices N=20 and $\sigma$=0.1.

Speed of Convergence:

The convergence of the diagonality ratio and the separation criterion are plotted as functions of the number of sweeps with noise in FIG. 4.

In all cases the method according to the present invention (J-Di) converges faster than FFDiag and LUJ1D which seem to behave similarly like in [7]. J-Di outperforms slightly FFDiag and LUJ1D in terms of the final separation criterion, which is what matters for BSS applications.

These simulations also show that different convergence rates, quadratic for FFDiag and linear for LUJ1D, can be compatible with similar performance when the matrix set is not exactly diagonalizable.

VII. COMPARISON WITH THE ALGORITHM OF WANG, LIU AND ZHANG

A comparison with the algorithm of Wang, Liu and Zhang [6] (hereafter DNJD) will be discussed herebelow. The proposed algorithm DNJD builds the mixing matrix by successive multiplications of matrices $J(\theta,\Psi,i,j)$ defined by $$J(\theta, \psi, i, j) \stackrel{\Delta}{=} \begin{pmatrix} I_{i-1} & \vdots & 0 & \vdots & 0 \\ \cdots & \rho\cos\theta & \cdots & \rho\sin\theta & \cdots \\ 0 & \vdots & I_{j-i-1} & \vdots & 0 \\ \cdots & \rho\cos\psi & \cdots & \rho\sin\psi & \cdots \\ 0 & \vdots & 0 & \vdots & I_{N-j} \end{pmatrix}$$

With:

$$\rho = \left(1 + \frac{\sin 2\theta \sin 2\psi}{2}\right)^{-1/4}$$

This definition is clearly an attempt to generalize the Givens rotations and the Jacobi-like algorithm of JADE. It is clear that the DNJD algorithm is very different from the present invention. For instance, DNJD does not use nor the determinant constraint neither the hyperbolic trigonometry that are used in the method according to the invention.

The main difficulty with DNJD is the inversion of Eq. (16). No exact solution is provided when the $R_k$ matrices are not exactly diagonalizable making necessary to use approximate expressions that do not guarantee the actual minimization of the off-diagonal entries. Therefore it is necessary to compute at each iteration (for each pair of indices) the evolution of the off-diagonal entries and to discard the update if the off-diagonal entries are increased. Unfortunately, the computational cost of this verification, 4KN, is equivalent to the cost of the algorithm itself (see page 5303 at the end of section III). Hence the cost of each sweep is multiplied by a factor of two. In addition, each time a couple of angles ($\theta$, $\phi$) is discarded, many computations (8KN flops) are made without any improvement of the cost function. This waste could explain the larger number of sweeps used by DNJD (Fig. 1 p. 5303 in [6]) than by J-Di (table I).

In summary, J-Di over-performs DNJD in terms of complexity per sweep by a factor larger than two.

VIII. CONCLUSION

A new method (J-Di) of non-orthogonal joint diagonalization has been presented. In one embodiment, this method comprises:
constructing a mixing matrix that belongs to the special linear group and whose columns are of equal norm, instead of constructing it in the special orthogonal group,
multiplying Givens rotations, hyperbolic rotations and diagonal matrices instead of only Givens rotations.

This new method admits many variants: the order of the elementary matrix multiplications, the stop test, the pre-whitening or not, etc. Its robustness and reduced complexity allow to deal with large dimension problems: up to N=500 and K=600 on a standard computer.

REFERENCES

[1] Comparaison de méthodes de séparations de sources, Souloumiac A., Cardoso J.-F., *Proceedings of GRETSI* 1991, Juan les Pins, Septembre 1991.

[1b] Blind beamforming for non Gaussian signals, Jean-Frangois Cardoso and Antoine Souloumiac, In *IEE Proceedings-F*, 140(6):362-370, December 1993.

[2] A blind source separation technique using second-order statistics, Belouchrani A., AbedMeraim K., Cardoso J.-F., Moulines E., *IEEE TRANSACTIONS ON SIGNAL PROCESSING* 45 (2): 434-444, FEB 1997.

[3] Joint Approximate Diagonalization of Positive Definite Hermitian Matrices, Pham D. T., *SIAM J. on Matrix Anal. and Appl.*, 22(4): 1136-1152, 2001.

[4] A Fast Algorithm for Joint Diagonalization with Non-orthogonal Transformations and its Application to Blind Source Separation, Ziehe A., Laskov P., Nolte G., Müller K.-R., *Journal of Machine Learning Research* 5 (2004) 777-800.

[5] Quadratic Optimization for Simultaneous Matrix Diagonalization, Voligraf R., Obermayer K., *IEEE Trans. on Signal Processing*, vol. 54, no. 9, pp. 3270-3278, September 2006.

[6] Nonorthogonal Joint Diagonalization Algorithm Based on Trigonometric Parametrization, Wang F., Liu Z., Zhang J., *IEEE Trans. on Signal Processing*, vol. 55, no. 11, pp. 5299-5308, November 2007.

[7] Simple LU and QR Based Non-Orthogonal Matrix Joint Diagonalization, B. AFSARI, Independent Component Analysis and Blind Source Separation, Lecture Notes in Computer Science, vol. 3889, pp. 1-7, 2006.

[8] Matrix Computations, G. H. GOLUB, C. F. VAN LOAN, Baltimore, Johns Hopkins University Press, 3rd edition, 1996.

[9] What Can Make Joint Diagonalization Difficult?, B. AFSARI, ICASSP 2007, Vol. 3, pp. III-1377-1380, 15-20 Apr. 2007.

[10] Sensitivity Analysis for the problem of Non-Orthogonal Matrix Joint Diagonalization, B. AFSARI, Submitted to SIAM J. on Matrix Computations.

[11] Non-Orthogonal Joint Diagonalization in the Least-Squares Sense with Application in Blind Source Separation, A. YEREDOR, IEEE Trans. on Signal Processing, vol. 50, no. 7, pp. 1545-1553, July 2002.

[12] Sur la diagonalisation conjointe approchée par un critère des moindres carrés, S. DEGERINE, in Proceedings XVIII Colloque Gretsi 2001, n2, pp. 311-314, Toulouse, France, September 2001.

The invention claimed is:

1. A method for separating mixed signals $(x_1(t), \ldots, x_N(t))$ recorded by at least two sensors into a plurality of component signals $(s_1(t), \ldots, s_M(t))$, each mixed signal $x_n(t)$ corresponding to a linear combination of the component signals $(s_1(t), \ldots, s_M(t))$ stemming from independent sources, each mixed signal being able to be written as the product of a mixture matrix (A) multiplied by a vector of the component signals stemming from the sources $(s_1(t), \ldots, s_M(t))$,
wherein the method comprises a joint diagonalization step (300) comprising a computer estimating the mixture matrix from a product of rotation matrices corresponding to one or more Givens rotation matrices ($G(\theta)$) and to one or more hyperbolic rotation matrices ($H(\phi)$).

2. The method according to claim 1, wherein the Givens rotation matrices include elements corresponding to trigonometric functions of $\theta$ and hyperbolic rotation matrices include elements corresponding to hyperbolic functions of $\phi$.

3. The method according to claim 2, wherein the diagonalization step comprises:
multiplying a family of estimated matrices ($\hat{R}_k$) by:
the product of a Givens rotation matrix and by a hyperbolic rotation matrix, and by
the transposed matrix of this product, and
estimating the $\theta_n$ and $\phi_n$ values with which the non-diagonal terms of the resulting matrices of order n of this multiplication may be minimized.

4. The method according to claim 3, wherein the multiplying step is repeated on resulting matrices of order n.

5. The method according to claim 4, wherein the multiplying step is repeated until the Givens angle $\theta_n$ and the hyperbolic angle $\phi_n$ are such that $\cos\theta_n$ and $\cos h\phi_n$ respectively tend to one or the corresponding sines to zero.

6. The method according to claim 1, wherein the estimated matrices are equal to the product of the mixture matrix by any diagonal matrix by the transposed mixture matrix, the estimated matrices being either matrices of cumulants, or covariance matrices in different frequency bands, or intercorrelation matrices with different time shifts, or covariance matrices estimated over different time intervals.

7. The method according to claim 1, wherein the Givens rotation matrices comprise $\cos\theta$ terms on the diagonal, a $\sin\theta$ term below the diagonal and a $-\sin\theta$ term above the diagonal, and the hyperbolic rotation matrices comprise $\cos h\phi$ elements on the diagonal, a $\sin h\phi$ element below the diagonal and a $\sin h\phi$ element above the diagonal.

8. The method according to claim 7, wherein the Givens rotation matrices are of the $$\begin{pmatrix} \cos\theta & -\sin\theta \\ \sin\theta & \cos\theta \end{pmatrix}$$

type and the hyperbolic rotation matrices are of the $$\begin{pmatrix} \cos h\varphi & \sin h\varphi \\ \sin h\varphi & \cos h\varphi \end{pmatrix}$$

type.

9. A nontransitory computer readable medium storing a program with instructions for applying a method for separating mixed signals $(x1(t), \ldots, xN(t))$ recorded by at least two sensors into a plurality of component signals $(s1(t), \ldots, sMt))$, each mixed signal $xn(t)$ corresponding to a linear combination of the component signals $(s1(t), \ldots, sM(t))$ stemming from independent sources, each mixed signal being able to be written as the product of a mixture matrix (A) multiplied by a vector of the component signals stemming from the sources $(s1(t), \ldots, sM(t))$, wherein the method further comprises:
a joint diagonalization step (300) comprising estimating the mixture matrix from a product of rotation matrices corresponding to one or more Givens rotation matrices ($G(\theta)$) and to one or more hyperbolic rotation matrices ($H(\phi)$).

10. The nontransitory computer readable medium according to claim 9, wherein the Givens rotation matrices include elements corresponding to trigonometric functions of $\theta$ and hyperbolic rotation matrices include elements corresponding to hyperbolic functions of $\phi$.

11. The nontransitory computer readable medium according to claim 10, wherein the diagonalization step further comprises:
Multiplying a family of estimated matrices ($\hat{R}_k$) by:
The product of a Givens rotation matrix and by a hyperbolic rotation matrix, and by
The transposed matrix of this product, and
estimating the $\theta_n$ and $\phi_n$ values with which the non-diagonal terms of the resulting matrices of order n of this multiplication may be minimized.

12. The nontransitory computer readable medium according to claim 11, wherein the multiplication step is repeated on resulting matrices of order n.

13. The nontransitory computer readable medium according to claim 12, wherein the multiplication step is repeated until the Givens angle $\theta_n$, the hyperbolic angle $\phi_n$ are such that $\cos\theta_n$ and $\cos h\phi_n$ respectively tend to one or the corresponding sines to zero.

14. The nontransitory computer readable medium according to claim 9, wherein the estimated matrices are equal to the product of the mixture matrix by any diagonal matrix by the transposed mixture matrix, the estimated matrices being either matrices of cumulants, or covariance matrices in different frequency bands, or intercorrelation matrices with different time shifts, or covariance matrices estimated over different time intervals.

15. The nontransitory computer readable medium according to claim 9, wherein the Givens rotation matrices comprise case terms on the diagonal, a $\sin\theta$ term below the diagonal and a $-\sin\theta$ term above the diagonal, and the hyperbolic rotation matrices comprise $\cos h\phi$ elements on the diagonal, a $\sin h\phi$ element below the diagonal and a $\sin h\phi$ element above the diagonal.

16. The nontransitory computer readable medium according to claim 15, wherein the Givens rotation matrices are of the $$\begin{pmatrix} \cos\theta & -\sin\theta \\ \sin\theta & \cos\theta \end{pmatrix}$$

type and the hyperbolic rotation matrices are of the $$\begin{pmatrix} \cos h\varphi & \sin h\varphi \\ \sin h\varphi & \cos h\varphi \end{pmatrix}$$

type.

* * * * *